United States Patent
Hayakawa

(10) Patent No.: US 6,252,749 B1
(45) Date of Patent: *Jun. 26, 2001

(54) THIN FILM MAGNETIC HEAD HAVING A GAP LAYER WITH IMPROVED THERMAL CONDUCTIVITY

(75) Inventor: Yasuo Hayakawa, Niigata-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,553

(22) Filed: Sep. 16, 1998

(30) Foreign Application Priority Data

Mar. 5, 1998 (JP) .................................. 10-053329
Sep. 17, 1999 (JP) .................................. 9-252309

(51) Int. Cl.[7] ..................................... G11B 5/39
(52) U.S. Cl. ............................................ 360/320
(58) Field of Search ..................... 360/320, 319, 360/324.1

(56) References Cited

U.S. PATENT DOCUMENTS

| | | | |
|---|---|---|---|
| 5,617,071 | * 4/1997 | Daughton | 338/32 R |
| 5,644,455 | 7/1997 | Schultz | 360/113 |
| 5,771,141 | * 6/1998 | Ohtsuka et al. | 360/113 |
| 5,811,971 | * 9/1998 | Senda et al. | 324/244 |
| 5,849,422 | * 12/1998 | Hayashi | 428/611 |
| 5,905,611 | * 5/1999 | Yoda et al. | 360/113 |
| 5,930,084 | * 7/1999 | Dovek et al. | 360/113 |
| 5,930,086 | * 7/1999 | Chaug et al. | 360/113 |

FOREIGN PATENT DOCUMENTS

| | | |
|---|---|---|
| 5-205224 | * 8/1993 | (JP) . |
| 5-347007 | 12/1993 | (JP) . |
| 6-195647 | 7/1994 | (JP) . |
| 6-274830 | 9/1994 | (JP) . |
| 7-296337 | * 11/1995 | (JP) . |
| 9-91625 | 4/1997 | (JP) . |
| 10-228610 | * 8/1998 | (JP) . |

* cited by examiner

Primary Examiner—Jefferson Evans
(74) Attorney, Agent, or Firm—Brinks Hofer Gilson & Lione

(57) ABSTRACT

A thin film magnetic head comprises a lower gap layer composed of an adhesion layer formed of $Al_2O_3$ or the like, an AlN film having a high thermal conductivity and a protective layer formed of $Al_2O_3$ or the like. Since the lower gap layer comprises the AlN film, it has an extremely high thermal conductivity as compared to conventional equivalents. Accordingly, heat generated from a magnetoresistive element layer can be escaped through the lower gap layer to a lower shield layer so as to inhibit the temperature of element from elevating and to obtain a satisfactory regeneration sensitivity.

36 Claims, 13 Drawing Sheets

THIN FILM MAGNETIC HEAD HAVING A GAP LAYER WITH IMPROVED THERMAL CONDUCTIVITY

BACKGROUND OF THE INVENTION

1. Field of the Invention

The present invention relates to thin film magnetic heads mounted on, for example, hard disk drives. To be more specific, it relates to thin film magnetic heads composed of a gap layer formed over and/or under a magnetoresistive element layer, which gap layer comprises an improved material or structure so as to have an enhanced thermal conductivity.

2. Description of the Related Art

FIG. 16 is an enlarged sectional view of a conventional thin film magnetic head illustrated from an opposite side of a recording medium.

This thin film magnetic head is a reading head with the use of magnetoresistance effect, and mounted, for instance, on a trailing side edge of a constitutive slider of a floating type head. Onto the thin film magnetic head (reading head) shown in FIG. 16, a so-called inductive head for writing can be laminated.

The reference numeral 1 in FIG. 16 indicates a lower shield layer composed of, for example, sendust or a Ni—Fe alloy (Permalloy; trade mark). Onto the lower shield layer 1 is formed a lower gap layer 20 composed of a non-magnetic material such as $Al_2O_3$ (aluminium oxide), and onto the lower gap layer 20, a magnetoresistive element layer 16 is formed.

The magnetoresistive element layer 16 can be classified into an anisotropic magnetoresistive (AMR) element using an element having magnetoresistance effect, and a giant magnetoresistive (GMR) element using an element having giant magnetoresistance effect. For providing higher recording density, a GMR element having a superior regeneration sensitivity is preferably employed. There are some species of structures which produce giant magnetoresistance effect, among which a structure called as a spin-valve type thin film element is comparatively simple and can change its resistance even in a weak magnetic field. The spin-valve type thin film element has the simplest structure composed of four layers, i.e., a free magnetic layer (a Ni—Fe alloy), a non-magnetic electrically conductive layer (Cu), a pinned magnetic layer (a Ni—Fe alloy) and an antiferromagnetic layer (e.g., an Fe—Mn alloy).

As illustrated in FIG. 16, hard bias layer 4 as longitudinal bias layer is formed on both sides of the magnetoresistive element layer 16, and electrode layer 5 composed of a non-magnetic electrically conductive material having a small electric resistance such as Cu (copper) or W (tungsten) is formed on the hard bias layer 4, respectively. When the magnetoresistive element layer 16 is composed of the aforementioned spin-valve type thin film element and a sensing current is applied to the electrode layers 5, the sensing current is to flow in the pinned magnetic layer, non-magnetic electrically conductive layer and free magnetic layer of the spin-valve type thin film element.

Onto the electrode layer 5 an upper gap layer 21 composed of a non-magnetic material such as aluminium oxide is formed, and onto the upper gap layer 21, an upper shield layer 7 composed of sendust or Permalloy is formed, as shown in FIG. 16.

To enhance the regeneration sensitivity of the magnetoresistive element layer 16 for providing a high recording density, the density of a current from the electrode layer 5 should be increased. Increase of the current density, however, invites increase of heat generation from the magnetoresistive element layer 16 and hence elevation of the temperature of element of the magnetoresistive element layer. This is because the gap layers 20 and 21 formed under and over the magnetoresistive element layer 16 are each composed of an insulation film having a low thermal conductivity such as $Al_2O_3$.

By way of illustration, when the magnetoresistive element layer 16 is composed of a spin-valve type thin film element, elevation of the temperature of element of the magnetoresistive element layer 16 results in diffusion of nickel in the Ni—Fe alloy constituting the pinned magnetic layer and free magnetic layer, and of copper constituting the non-magnetic layer, which leads to collapse of multilayer structure of the element. The collapse of the multilayer structure in turn decreases a change rate of resistance and hence decreases the regeneration sensitivity. Not only in spin-valve type thin film elements but also in thin film magnetic heads using AMR effect, elevation of the temperature of element invites electromigration so as to impair the durability and to shorten the life time of the elements.

SUMMARY OF THE INVENTION

The present invention has been accomplished to solve the above problems. Accordingly, it is an object of the present invention to provide a thin film magnetic head composed of gap layers formed under and over a magnetoresistive element layer and having an improved material or structure and hence an enhanced thermal conductivity. In the thin film magnetic head, heat generated in the element can be escaped to an upper and lower shield layers and hence the current density can be increased and the regeneration sensitivity of the magnetoresistive element layer can be enhanced.

To be more specific, the present invention provides in one aspect a thin film magnetic head being composed of a lower shield layer, a lower gap layer formed on the lower shield layer, a magnetoresistive element layer formed on the lower gap layer, an electrode layer for giving a sensing current to the magnetoresistive element layer, an upper gap layer formed on the electrode layer, and an upper shield layer formed on the upper gap layer, wherein at least one of the lower gap layer and the upper gap layer is composed of an insulation film comprising at least one member selected from the group consisting of AlN, SiC, diamond-like carbon (DLC), BN, MgO, SiAlON, AlON, $Si_3N_4$, SiCO, SiN, SiON and SiCON.

Each of the above-mentioned insulation films has a higher thermal conductivity than $Al_2O_3$ conventionally used as gap layers.

In the present invention, it is preferred that the insulation film has a film structure composed of, in toto, a crystalline phase. This is because such a crystalline phase in toto improves the thermal conductivity of insulation film.

The aforementioned insulation film can have a film structure composed of a crystalline phase mixed with a small amount of an amorphous phase. An excessive amount of amorphous phase, however, results in an excessively low thermal conductivity of the insulation film. Accordingly, the amorphous phase should be minimized in quantity.

The insulation film may be incorporated with non-magnetic metal grains. Since the non-magnetic metal grains have a higher thermal conductivity than the insulation film, incorporation of the non-magnetic metal grains into the insulation film provides a higher thermal conductivity.

The non-magnetic metal grains are preferably composed of at least one member selected from the group consisting of Cu, Ag, Au, Ti and Cr.

The non-magnetic metal grains may preferably have an average grain size of several nanometers or less. An excess average grain size increases the volume ratio of non-magnetic metal grains in the gap layers and decreases the volume ratio of the insulation film, and hence insulation properties are deteriorated or decayed.

Therefore, the average grain size of non-magnetic metal grains should advantageously be minimized.

Of the aforementioned insulation films, a film composed of AlN can advantageously be employed as the insulation film for its good crystallinity and high thermal conductivity.

In particular, when the insulation film is composed of AlN, it is preferable that a crystal face of a crystalline phase is preferred-oriented in the direction perpendicular to a plane of the film, for enhancing the thermal conductivity of the AlN film.

To be more specific, it is preferable that a (002) plane or a (220) plane of the crystalline phase is oriented in a direction perpendicular to a plane of the film.

The (002) plane of the crystalline phase is advantageously preferred-oriented in the direction perpendicular to the plane of the film. To be more specific, it is preferable that the ratio of peak intensity of the (002) plane relative to that of the (220) plane measured by X-ray diffractometry is preferably more than 0 and equal to or less than 3.5, or equal to or more than 9.7.

It is also preferred that the crystal grain boundary phase between crystalline phases in AlN is composed of an amorphous phase containing a light element, for improving the corrosion resistance of AlN against an alkaline aqueous solution.

The above-mentioned light element is preferably composed of at least one member selected from the group consisting of B, C, O and Si.

It is also advantageous in the present invention that a protective layer composed of an insulation material is formed on the insulation film.

In particular, when the insulation film is composed of AlN, the protective layer is formed in order to further improve the corrosion resistance of AlN against an alkaline aqueous solution and to smooth the surface of the gap layer composed of AlN.

The protective layer is advantageously composed of at least one member selected from the group consisting of $Al_2O_3$, $SiO_2$, $Ta_2O_5$ and SiC.

In the present invention, an anchor layer formed of an insulation material and composed of an amorphous phase is advantageously formed under the insulation film.

The anchor layer is composed of at least one member selected from the group consisting of $Al_2O_3$, Si, $SiO_2$, SiN and SiC.

The anchor layer may preferably be equal to or less than 100 angstroms in thickness.

The anchor layer should be formed because such an insulation film composed of AlN or diamond-like carbon has an extremely poor adhesion to a lower layer and has a large film stress so as to peel readily.

Accordingly, when the insulation film is composed of AlN or diamond-like carbon, previous formation of an anchor layer composed of, for example, $Al_2O_3$ having a good adhesion and low film stress as a primary coat of the insulation film can advantageously inhibit the insulation film from peeling.

The anchor layer, however, should be minimized in thickness, that is, in a thickness of 100 angstroms or less, and have a film structure of an amorphous phase.

Provided that the adhesion layer is composed of a crystalline phase, the film stress of the insulation film increases due to difference between the lattice constant of the crystalline phase in the adhesion layer and that in the insulation film, and hence the insulation film is liable to peel.

In another aspect the present invention provides a thin film magnetic head being composed of a lower shield layer, a lower gap layer formed on the lower shield layer, a magnetoresistive element layer formed on the lower gap layer, an electrode layer for imparting a sensing current to the magnetoresistive element layer, an upper gap layer formed on the electrode layer, and an upper shield layer formed on the upper gap layer, wherein at least one of the lower gap layer and the upper gap layer has a multilayer structure composed of an insulation layer and a non-magnetic metal layer laminated in turn, and a layer facing the magnetoresistive element layer is composed of the insulation layer.

In this aspect of the invention, the gap layer is composed of an insulation layer having insulation properties with the interposition of a non-magnetic metal layer having a high thermal conductivity so that the gap layer can have satisfactory insulation properties and an enhanced thermal conductivity.

Of the multilayer structures composed of an insulation layer and a non-magnetic metal layer, the gap layer preferably has a two-layer structure composed of one insulation layer and one non-magnetic metal layer, and a layer facing the magnetoresistive element layer is composed of the aforementioned insulation layer and a layer facing the shield layer is composed of the aforementioned non-magnetic metal layer. This structure enables the gap layer to form into a multilayer structure (two-layer structure) with a least number of manufacturing steps and with ease.

The insulation layer in this aspect may preferably be composed of an insulation film having a satisfactory thermal conductivity including AlN as mentioned above. In addition, when the insulation film is improved in crystallinity and incorporated with non-magnetic metal grains, the thermal conductivity of the insulation layer can further be enhanced.

The aforementioned non-magnetic metal layer is preferably composed of at least one member selected from the group consisting of Cu, Ag, Au, Ti and Cr.

When the upper gap layer has a multilayer or two-layer structure constituted of an insulating layer and a non-magnetic metal layer, it is necessary to prevent the non-magnetic metal layer from forming in the periphery of a connection (joint) between the electrode layer and a main electrode layer formed onto the upper gap layer.

This is because if the non-magnetic metal layer is formed in contact with the joint of the electrode layer and the main electrode layer, a current which should flow from the main electrode layer to the electrode layer flows also to the non-magnetic metal layer.

When the upper gap layer has a multilayer or two-layer structure constituted of an insulating layer and a non-magnetic metal layer, whereas the insulation layer is preferably formed of AlN or other substance having a satisfactory thermal conductivity as mentioned above, a material having excellent insulation properties such as $Al_2O_3$ or $SiO_2$ conventionally used as gap layers can also be employed as the insulation layer.

In the latter case, however, the thickness of insulation layer should be minimized. When the insulation layer is thick and composed of an insulation film having a poor thermal conductivity such as of $Al_2O_3$, heat generated from the magnetoresistive element layer is not transmitted through the insulation layer to the non-magnetic metal layer. Accordingly, like conventional thin film heads, the elevation of element temperature of the magnetoresistive element layer cannot be avoided. An insulation film composed of $Al_2O_3$ or $SiO_2$ has high insulation properties and hence provides satisfactory insulation even if the insulation layer is thin in thickness.

As described above, according to the present invention where the material or structure of the gap layer is improved, the thermal conductivity of the gap layer can be enhanced while maintaining insulation properties thereof.

Accordingly, even when the current density is increased in order to increase recording density, the heat generated from the magnetoresistive element layer can be transmitted through the gap layer having a satisfactory thermal conductivity to the shield layer so as to prevent the temperature of element of the magnetoresistive element layer from elevating and thereby to enhance regeneration sensitivity of the magnetoresistive element layer.

DESCRIPTION OF THE PREFERRED EMBODIMENT

Figure 1:
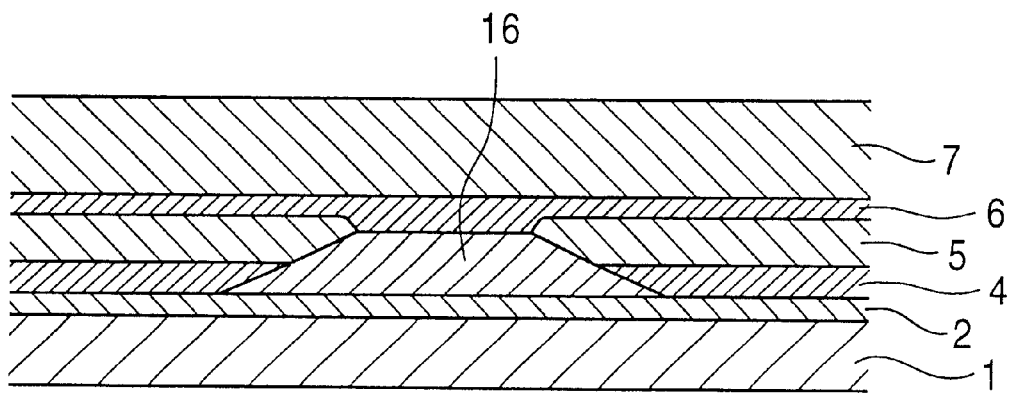
FIG. 1 is an enlarged sectional view illustrating a structure of a first embodiment of the thin film magnetic head of the present invention.
Figure 2:
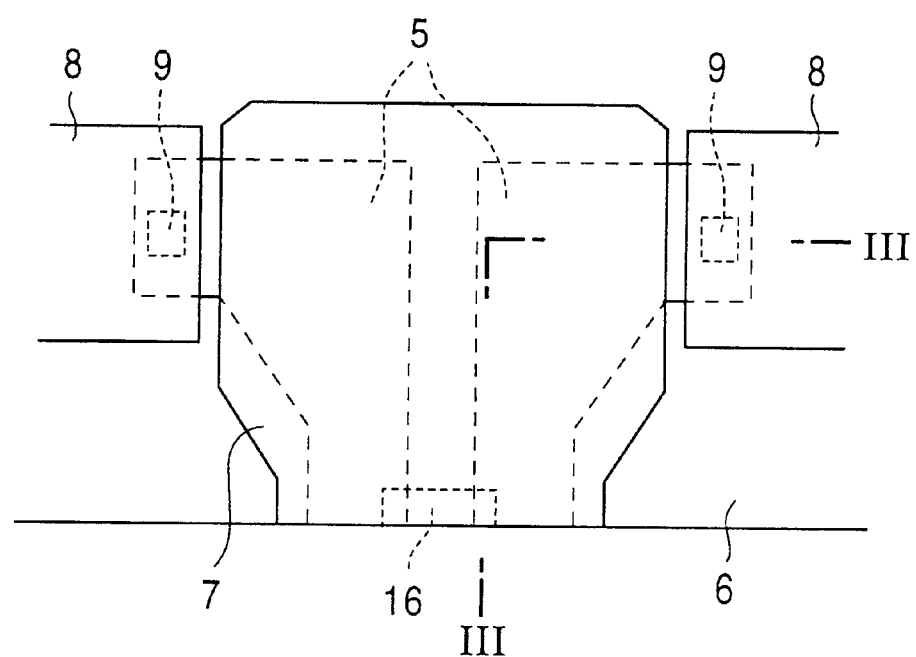
FIG. 2 is a plan view of FIG. 1.

FIG. 1 is an enlarged sectional view of a thin film magnetic head as the first embodiment of the invention illustrated from an opposite side to a recording medium; FIG. 2 is a plan view of FIG. 2; and FIG. 3 is a sectional view on the 3—3 line illustrated in FIG. 2.

Figure 3:
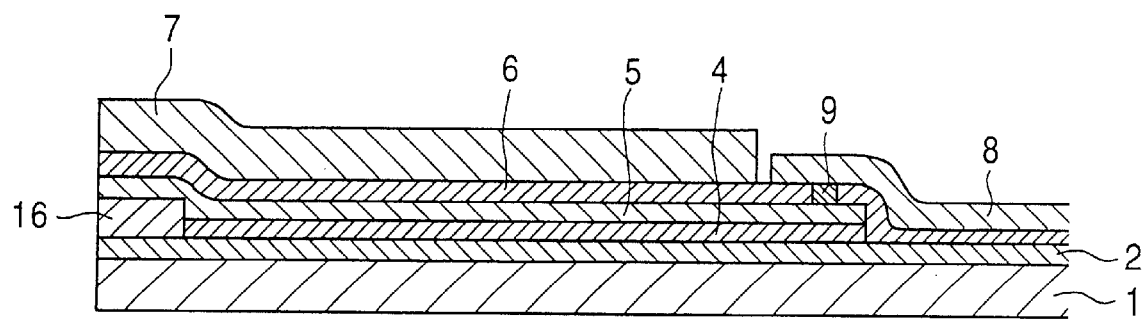
FIG. 3 is a sectional view by the 3—3 line shown in FIG. 2.

The thin film magnetic head as illustrated in FIGS. 1 to 3 is formed at a trailing side edge of a slider constituting a floating type head and composed of only a reading head. The thin film magnetic head according to the present invention can also be a MR/inductive composite thin film magnetic head formed by laminating an inductive head for writing composed of a core and a coil onto the aforementioned reading head.

The aforementioned reading head is used for sensing, with the use of magnetoresistance effect, a leakage magnetic field from a recording medium such as hard disk and for reading a recording signal.

The lowest layer indicated in FIGS. 1 to 3 is a lower shield layer 1 composed of, for instance, sendust or a Ni—Fe alloy (Permalloy), and onto the lower shield layer 1 a lower gap layer 2 is formed.

On the lower gap layer 2 a magnetoresistive element layer 16 is formed. The magnetoresistive element layer 16 is, for example, an AMR element having a three-layer structure composed of a soft adjacent layer (SAL) of a magnetically soft material (a Co—Zr—Mo alloy or a Ni—Fe—Nb alloy), a.SHUNT layer of a non-magnetic material (e.g., tantalum) and an MR layer (a Ni—Fe alloy) having magnetoresistance effect; or a spin-valve type thin film element (a kind of GMR elements) having four-layer-structure composed of an antiferromagnetic layer (e.g., a Pt—Mn alloy), a pinned magnetic layer (e.g., a Ni—Fe alloy, Co, a Co—Fe alloy, a Co—Ni alloy, a Ni—Fe—Co alloy), a non-magnetic electrically conductive layer (Cu) and a free magnetic layer (e.g., a Ni—Fe alloy, Co, a Co—Fe alloy, a Co—Ni alloy, a Ni—Fe—Co alloy).

On both sides of the magnetoresistive element layer 16 a pair of hard bias layers 4 and a pair of electrode layers 5 are formed. Taking the magnetoresistive element layer 16 composed of a spin-valve type thin film element mentioned above as an example, a bias magnetic filed from the hard bias layers 4 is imparted to the free magnetic layer, and a sensing current from the electrode layers 5 is imparted to the pinned magnetic layer, non-magnetic electrically conductive layer and free magnetic layer.

The hard bias layers 4 are composed of, for instance, a Co—Pt (cobalt-platinum) alloy or a Co—Cr—Pt (cobalt-chromium-platinum) alloy. The electrode layers 5 are composed of, for example, Cr (chromium), Ta (tantalum) or Cu (copper).

Onto the electrode layers 5 an upper gap layer 6 is formed, and on the upper gap layer 6 an upper shield layer 7 is formed of a magnetic material such as Permalloy (trade mark). The upper side view of the upper shield layer 7 is shown in FIG. 2.

As illustrated in FIGS. 2 and 3, a pair of main electrode layers 8 are formed on the upper gap layer 6 in a position facing each of the electrode layers 5.

As shown in FIG. 3, a pair of connections 9 composed of Cu (copper) or Cr (chromium) similarly to the electrode layers 5 and the main electrode layers 8 are formed on the upper gap layer 6 in the position of the electrode layers 5 facing the main electrode layer 8. The connections 9 make the electrode layer 5 and main electrode layer 8 electrically connected with each other.

According to the present invention, at least one of the lower gap layer 2 and the upper gap layer 6 (hereinafter referred to as "gap layer 2,6") is formed by an insulation film composed of one or more members selected from the group consisting of AlN, SiC, diamond-like carbon (DLC), BN, MgO, SiAlON, AlON, $Si_3N_4$, SiCO, SiN, SiON and SiCON.

Each of these materials of insulation films has a higher thermal conductivity than $Al_2O_3$ or $SiO_2$. Therefore, according to the present invention where the gap layer 2,6 is composed of the aforementioned insulation film, the thermal conductivity of the gap layer 2,6 can be improved. The thermal conductivity of major insulation materials as bulk materials is shown in Table 1 below for reference.

TABLE 1

| Material | Thermal Conductivity (W/mK) |
| --- | --- |
| $Al_2O_3$ | 30 |
| $SiO_2$ (Quartz) | 1.4 |
| AlN | 260 |
| SiC | 100 |
| C (Diamond) | 660 |
| BN | 57 |
| MgO | 40 |
| SiAlON | 33 |
| $Si_3N_4$ | 37 |

As indicated in Table 1, the insulation materials such as AlN and SiC used in the present invention have a higher thermal conductivity than those of $Al_2O_3$ and $SiO_2$ used as conventional gap layers.

In addition, as shown in Table 1, C (diamond) has a thermal conductivity of 660 W/mK, indicating that it has an extremely high thermal conductivity as compared to other insulation materials.

According to the present invention, diamond-like carbon (DLC) which is composed of a mixture of a crystalline phase and an amorphous phase can be employed as the gap layer 2,6. Since the diamond-like carbon contains an amorphous phase, it is supposed to have a lower thermal conductivity than C (diamond). The thermal conductivity of DLC can, however, be enhanced by increasing a proportion of a crystalline phase in DLC.

Incidentally, since the thermal conductivity of each of the insulation materials shown in Table 1 is a value as in a bulk material, it is speculated that the thermal conductivity of each of insulation materials formed into a film by sputtering or other process will show a somewhat different value from that indicated in Table 1.

To further enhance the thermal conductivity of the insulation film composed of AlN or the like used as the gap layer 2,6 in the invention, it is advantageous to increase a crystalline phase in volume ratio in the insulation film. More preferably, the film structure in toto of the insulation film should be a crystalline phase.

According to the invention, incorporation of non-magnetic metal grains having a higher thermal conductivity than the insulation film into the insulation film composed of AlN or the like can further increase the thermal conductivity of the film.

The non-magnetic metal grains just mentioned above are preferably composed of one or more members selected from the group consisting of Cu, Ag, Au, Ti and Cr.

When the gap layer 2,6 is composed of an insulation film of AlN or the like containing non-magnetic metal grains, the thermal conductivity thereof can be further enhanced while maintaining its insulation properties.

When the mean grain size of the non-magnetic metal grains are so high as to decrease the volume ratio of the insulation film in the gap layer 2,6 extremely, the insulation properties of the gap layer 2,6 are deteriorated, or adjacent grains of the non-magnetic metal grains overlap to invite electrical connection with each other, and hence the insulation properties of the gap layer 2,6 may be completely diminished.

Accordingly, the mean grain size of the non-magnetic metal grains should preferably be minimized. To be more specific, it should be several nanometers or less.

The insulation film can be incorporated with the non-magnetic metal grains by simultaneously forming an insulation material and non-magnetic metal into a film by means of, for example, sputtering.

As described above, the present invention, where the lower gap layer 2 and the upper gap layer 6 (or either one of them) are composed of an insulation film having an excellent thermal conductivity such as of AlN or SiC, enables heat generated from the magnetoresistive element layer 16 to escape efficiently through the gap layer 2,6 to the shield layers 1 and 7.

In addition, according to the invention, the thermal conductivity of the gap layer 2,6 can further be enhanced by increasing the proportion of a crystalline phase in the insulation film or by incorporating non-magnetic metal grains into the insulation film.

Of the aforementioned insulation films, the use of AlN as the gap layer 2,6 is particularly desirable. This is because AlN has a satisfactory crystallinity and a high thermal conductivity as shown in Table 1.

In particular, to enhance the thermal conductivity of the insulation film composed of AlN, a crystal face of the crystalline phase should advantageously be preferred-oriented in a direction perpendicular to a plane of the film.

By way of illustration, it is preferred that either a (002) plane or a (220) plane of the crystalline phase is oriented in the direction perpendicular to the plane of the film.

Alternatively, it is also desirable that the (002) plane of the crystalline phase is preferred-oriented in the direction perpendicular to the plane of the film. To be more specific, the peak intensity ratio of the (002) plane relative to the (220) plane as measured by X-ray diffractometry should preferably be more than 0 and equal to or less than 3.5, or equal to or more than 9.7.

It was found from experiences that the peak intensity ratio of the (002) plane relative to the (220) plane ranging from 3.5 to 9.7 deteriorates the thermal conductivity of the insulation film and hence increases elevation rate of the temperature of element (see FIG. 15; explanation of the graph will be described below).

In other words, when the gap layer 2,6 is composed of AlN, a crystal face of a crystalline phase is advantageously preferred-oriented in the direction perpendicular to the plane of the film in order to further enhance the thermal conductivity thereof. More concretely, it is preferable that a (002) plane or a (220) plane of the crystalline phase is oriented in the direction perpendicular to the plane of the film, or that the (002) plane of the crystalline phase is preferred-oriented in the direction perpendicular to the film plane so that the peak intensity ratio of the (002) plane relative to the (220) plane measured by X-ray diffractometry is more than 0 and equal to or less than 3.5, or equal to or more than 9.7.

Incidentally, although AlN has a satisfactory crystallinity and a high thermal conductivity as mentioned above and hence it is one of the most preferable insulation materials as an insulation film used as the gap layer 2,6, AlN is characterized by dissolving easily in an alkaline aqueous solution.

Since such an alkaline aqueous solution is employed as a developing solution in patterning of photoresist, the gap layer 2,6 should have insolubility in an alkaline aqueous solution.

TABLE 2

| Material | Etching rate (Å/min.) |
| --- | --- |
| AlN | 410 |
| $Al_2O_3$ | 76.5 |
| $SiO_2$ | 0.5 |
| $Ta_2O_5$ | ≈0 |

The etching rates of insulation materials to an alkaline solution are set forth in Table 2.

As is apparent from the table, AiN has a very high etching rate than conventional insulation materials such as $Al_2O_3$ and $SiO_2$ conventionally employed as a gap layer 2,6.

Figure 7:
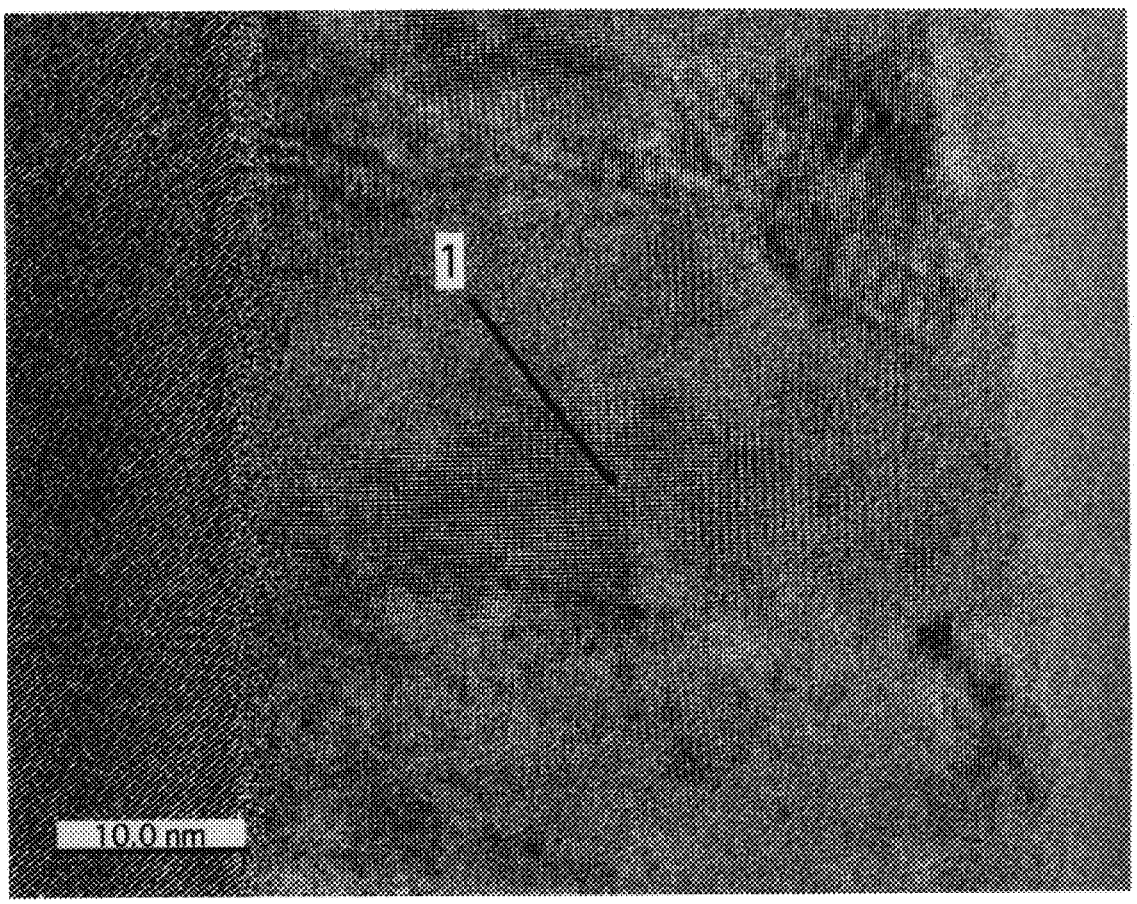
FIG. 7 is a high resolution transmission electron micrograph (TEM) of an AlN film comprising no light element.
Figure 8:
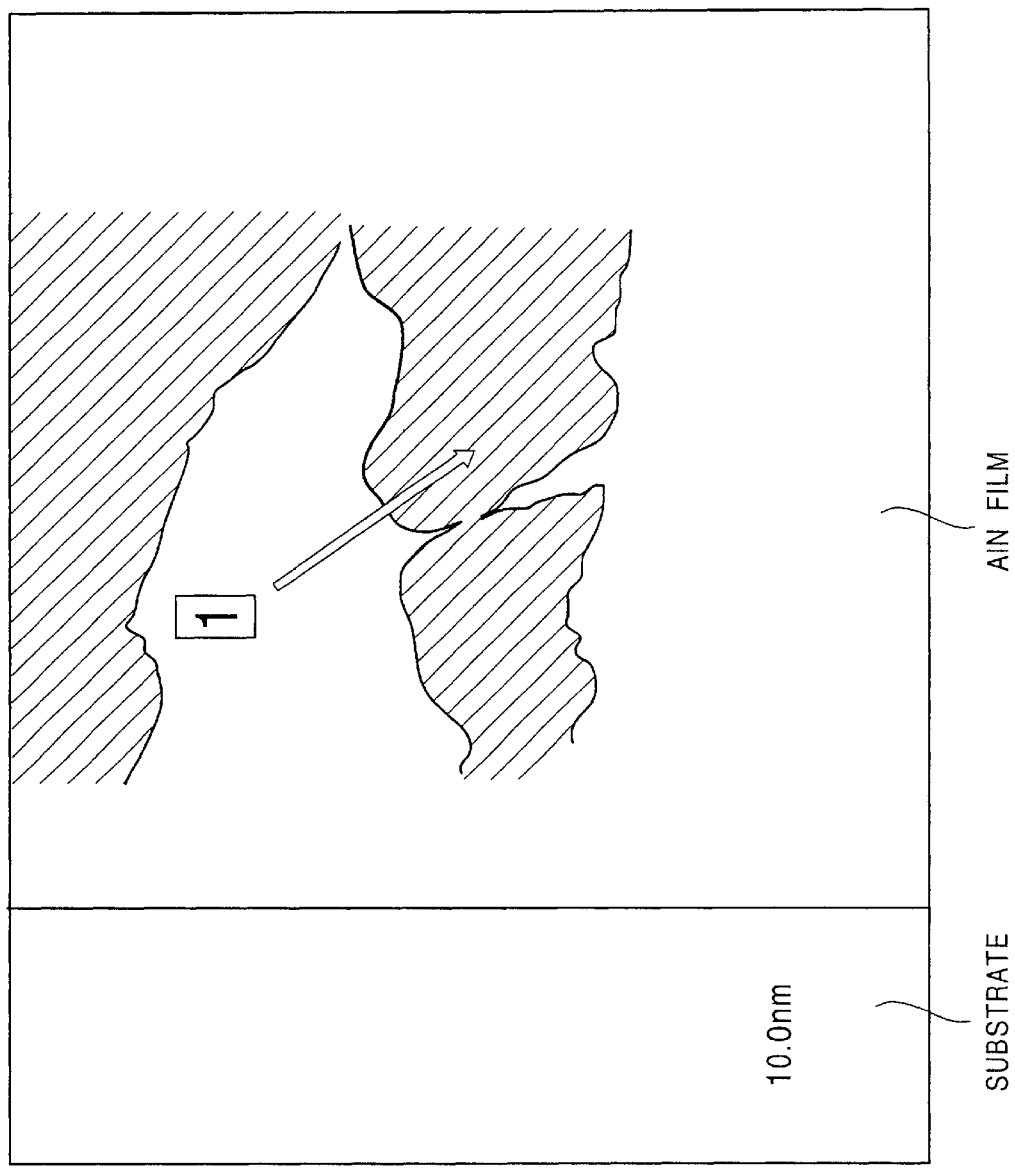
FIG. 8 is a partial mimetic diagram of the high resolution transmission electron micrograph shown in FIG. 7.

FIG. 7 is a high resolution transmission electron micrograph (TEM) of an AlN film formed on a substrate and FIG. 8 is a mimetic diagram illustrating a part of the high resolution transmission electron micrograph shown in FIG. 7.

The area pointed by the reference numeral 1 in the high resolution transmission electron micrograph shown in FIGS. 7 and 8 indicates a crystalline phase, illustrating that this crystalline phase is composed of a columnar crystal.

Figure 5:
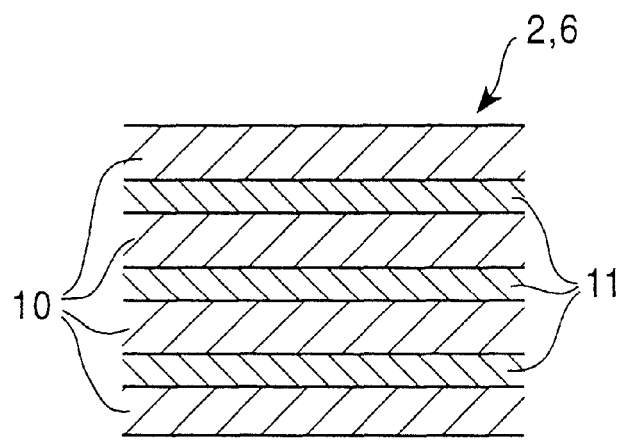
FIG. 5 is an enlarged partial sectional view of a gap layer illustrating a structure of a third embodiment of the present invention.

As is found from FIG. 7, the crystalline phase comprises a large mass of each crystal and is formed into a columnar crystal through the film. One of reasons of a high thermal conductivity of an AlN film resides in that the crystalline phases thereof are columnar crystals as shown in FIG. 5.

The space between each of the crystalline phases is an amorphous crystal grain boundary phase.

Since each crystalline phase is a columnar crystal as described above, the crystal grain boundary phase formed between each of the crystalline phases is supposed to be formed in the direction from the surface of the film to the substrate (bottom of the film).

It is speculated that an alkaline aqueous solution permeates from a crystal grain boundary phase formed on the surface (i.e., exposed to) of the AlN film into inside the AlN film and dissolves the film.

According to the present invention, therefore, an amorphous phase containing a light element being chemically more stable against an alkaline solution than AlN, i.e., one or more member selected from the group consisting of B, C, O and Si, is separated in the crystal grain boundary phase so as to improve corrosion resistance of the AlN film.

As apparent from Table 2, $Al_2O_3$ containing oxygen (O) and $SiO_2$ containing silicon (Si) have a lower etching rate against an alkaline aqueous solution than that of AlN, and it is speculated that incorporation of oxygen or silicon into the film improves the corrosion resistance thereof.

To deposit or separate an amorphous phase containing a light element in the crystal grain boundary phase of the AlN film, a target of AlN containing B, C, O, Si or other light elements is employed for sputtering.

Figure 9:
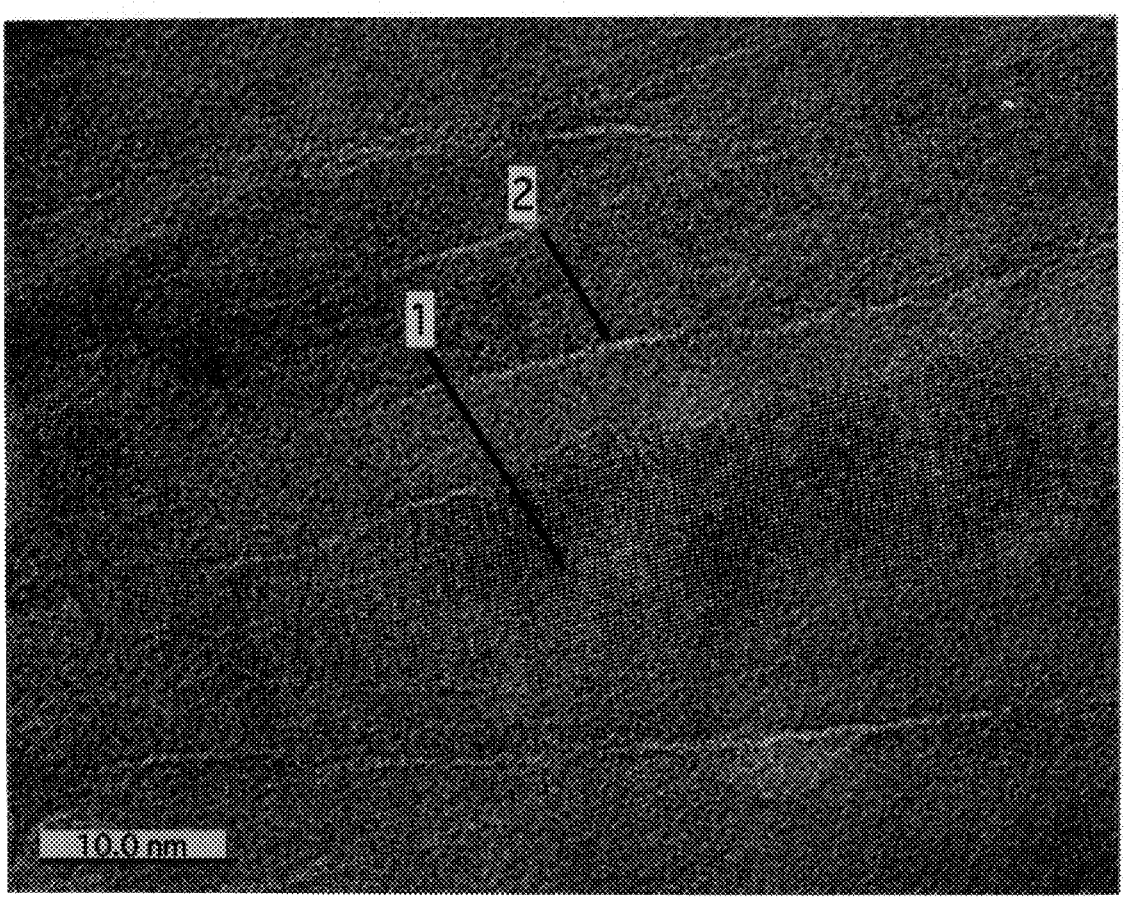
FIG. 9 is a high resolution transmission electron micrograph of an AlN film comprising any light element.
Figure 10:
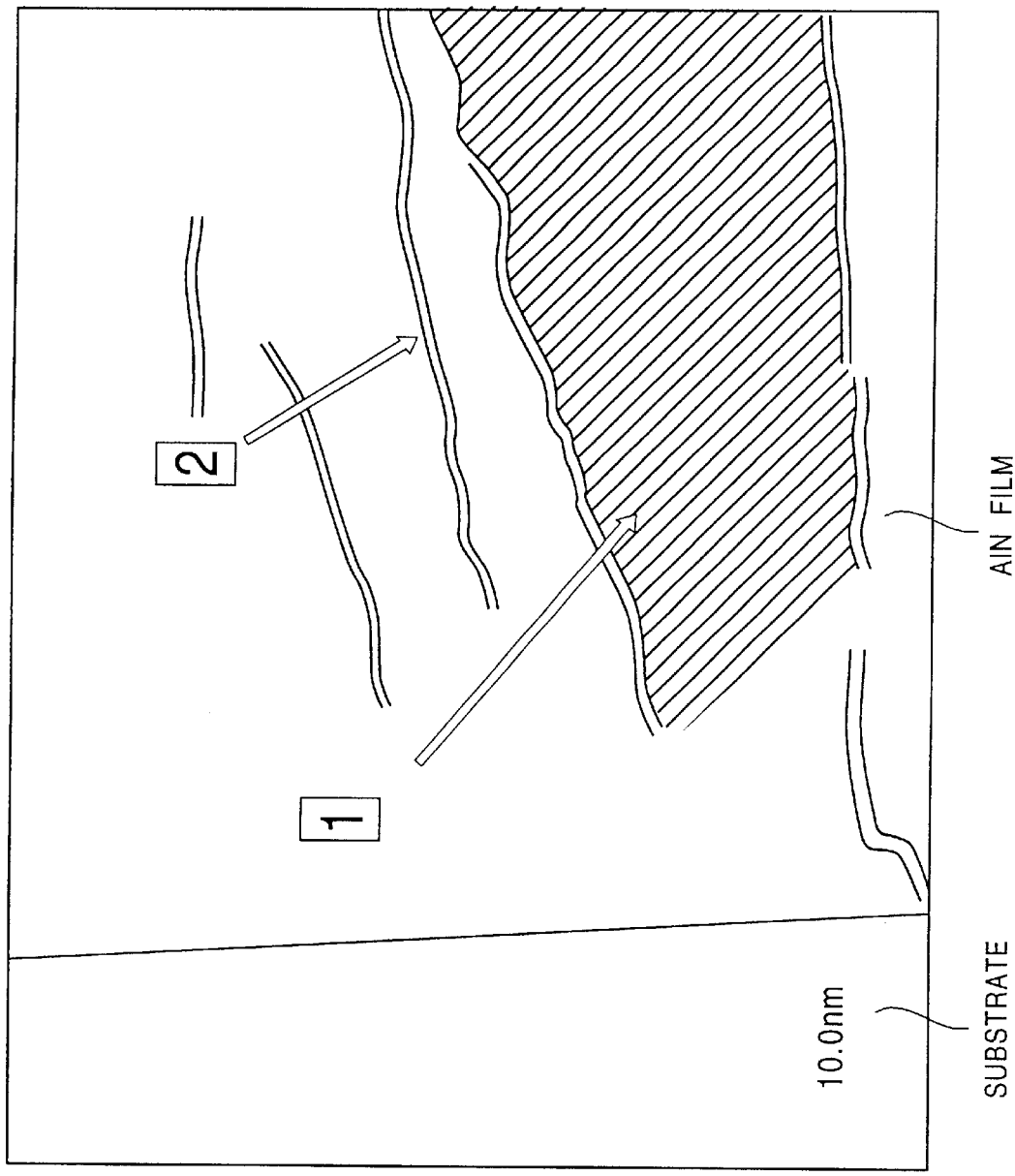
FIG. 10 is a partial mimetic diagram of the high resolution transmission electron microscopy illustrated in FIG. 9.

FIG. 9 is a high resolution transmission electron micrograph (TEM) of an AlN film obtained by forming an AlN film containing a light element in its crystal grain boundary phase on a substrate, and FIG. 10 is a partial mimetic diagram illustrating the high resolution TEM shown in FIG. 9.

The reference numeral 1 shown in FIGS. 9 and 10 indicates a crystalline phase and the reference numeral 2 indicates a crystal grain boundary phase.

As apparent from FIGS. 9 and 10, the crystalline phase in FIGS. 9 and 10 is a columnar crystal as well as the crystalline phase shown in FIGS. 7 and 8.

In the high resolution transmission electron micrograph of FIG. 9, the crystal grain boundary phase (numeral 2) in the form of a belt adjacent the crystalline phase (numeral 1) is photographed in white. This is because the grain boundary phase contains a light element such as B or O.

On the contrary, in the high resolution transmission electron micrograph shown in FIG. 7, the crystal grain boundary phase between each of the crystalline phases (reference numeral 1) is indistinct without such a portion photographed in white as the crystal grain boundary phase (reference numeral 2) shown in FIG. 9.

This is because the AlN film shown in FIG. 7 contains no light element such as B or O in its crystal grain boundary phase.

When a crystal grain boundary phase of AlN contains a light element such as B or C as in the present invention, the thermal conductivity of the crystal grain boundary phase is supposed to decrease. The crystalline phase of the AlN is, however, a columnar phase as mentioned above, therefore, heat generated in the magnetoresistive element layer can be satisfactorily transmitted through the crystalline phase. Thus, it is speculated that the crystal grain boundary phase having a low thermal conductivity does not very much affect thermal conduction.

When an amorphous phase containing a light element such as B or C is separated or deposited in a crystal grain boundary phase of AlN as in the present invention, the corrosion resistance of AlN against an alkaline aqueous solution can be improved and hence its etching rate can be decreased from 410 (angstrom/min) when its crystal grain boundary phase contains no light element to about 75 (angstrom/min).

Figure 4:
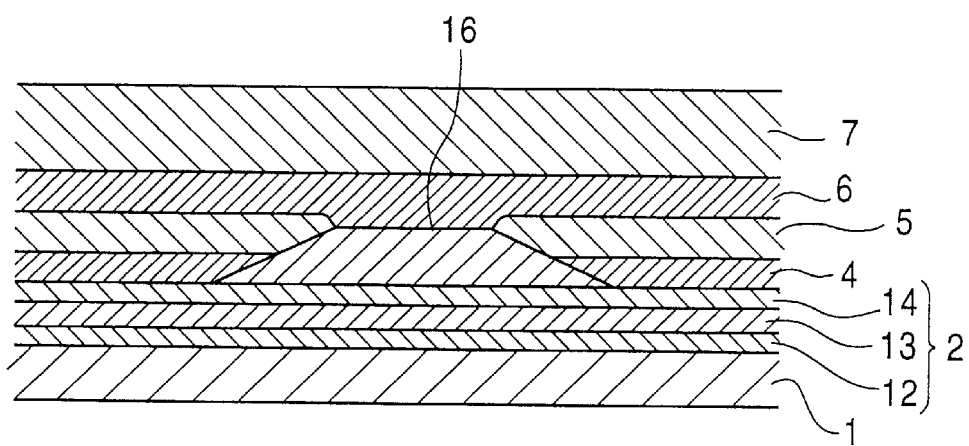
FIG. 4 is an enlarged sectional view showing a structure of a second embodiment of the thin film magnetic head of the invention.

FIG. 4 is a sectional view of a thin film magnetic head illustrating a preferable structure when an AlN film 13 is used as the lower gap layer 2.

As illustrated in FIG. 4, an adhesion layer 12 composed of an insulation material is formed on the lower shield layer 1, and onto this adhesion layer 12, the AlN film 13 is formed.

In this embodiment, the AlN film 13 is not formed directly on the lower shield layer 1 but formed with the interposition of the adhesion layer 12. This is because the AlN film 13 has a poor adhesion to a lower layer (the lower shield layer 1) and a high film strength so that it liable to peel.

Therefore, according to this embodiment, the adhesion layer 12 composed of an insulation material is first formed on the lower shield layer 1 and then the AlN film 13 is formed on the adhesion layer 12.

The anchor layer 12 in the present invention should be an amorphous phase. Provided that the adhesion layer 12 is a crystalline phase, the film stress of the AlN film 13 increases due to difference between the lattice constant of the AlN film 13 and that of the adhesion layer 12.

In the present invention, the adhesion layer 12 is advantageously formed of one or more members selected from the group consisting of $Al_2O_3$, Si, $SiO_2$, SiN and SiC which have a low film stress and excellent adhesion.

In addition, the film thickness of the adhesion layer 12 is preferably minimized, and to be more specific, is equal to or less than 100 angstroms.

The anchor layer 12 thick in film thickness is not preferred because the thermal conductivity of the lower gap layer 2 is decreased when it is composed of an insulation material having a low thermal conductivity such as $Al_2O_3$, and such a great film thickness invites the adhesion layer 12 to contain a crystalline phase so as to increase the film stress of AlN film 13 as described above.

When the insulation film is composed of diamond-like carbon (DLC), the adhesion layer 12 is also preferably formed under the insulation film.

In addition, a protective layer 14 composed of an insulation material is formed on the AlN film 13, as illustrated in FIG. 4.

Since the surface of the AlN film 13 is very rough, the magnetoresistive element layer 16 or other layer can hardly be formed directly on the AlN film 13, and accordingly the protective layer 14 is formed on the AlN film 13 for smoothing the surface of the lower gap layer 2.

As described above, the AlN film 13 has a poor corrosion resistance against an alkaline aqueous solution so that it is preferably contains a light element being chemically stable such as B or C separated in its crystal grain boundary phase. In addition, when an insulation material having a satisfactory corrosion resistance against an alkaline aqueous solution is employed as the protective layer 14 according to the invention, the corrosion resistance of the AlN film can further be enhanced.

Therefore, the protective layer 14 is advantageously composed of one or more members selected from $Al_2O_3$, $SiO_2$ and $Ta_2O_5$ shown in Table 2 each having an excellent corrosion resistance.

In addition, the protective layer 14 is preferably minimized in thickness.

In the thin film magnetic head illustrated in FIG. 4, the upper gap layer 6 is composed of a conventional insulation material such as $Al_2O_3$, whereas the upper gap layer 6 can be composed of an AlN film 13 similarly to the lower gap layer 2. In such a case, it is more preferable to form an adhesion layer 12 composed of an insulation material under the AlN film 13 and a protective layer 14 of an insulation material on the AlN film 13.

According to the present invention, the AlN film 13 can be incorporated with non-magnetic metal grains having a higher thermal conductivity than the AlN film 13.

The non-magnetic metal grains are preferably composed of one or more members selected from the group consisting of Cu, Ag, Au, Ti and Cr.

Next, to further enhance the thermal conductivity of the gap layer 2,6, the structures of the lower gap layer 2 and the upper gap layer 6 (or either one of them) are improved according to the present invention.

FIG. 5 is an enlarged partial sectional view illustrating the lower gap layer 2 and the upper gap layer 6.

As illustrated in FIG. 5, the gap layer 2,6 has a multilayer structure comprising an insulation layer 10 and a non-magnetic metal layer 11 each laminated in turn.

The insulation layer 10 is preferably formed by an insulation film composed of one or more members selected from AlN, SiC, diamond-like carbon (DLC), BN, MgO, SiAlON, $Si_3N_4$, SiCO, SiN, SiON and SiCON, each of which has a satisfactory thermal conductivity as mentioned above. Of these substances, the insulation film is more advantageously composed of AlN.

The non-magnetic metal layer 11 is advantageously composed of a metal or an alloy of members selected from the group consisting of Cu, Ag, Au, Ti and Cr.

According to this embodiment, where the non-magnetic metal layer 11 having a higher thermal conductivity than the insulation layer 10 is interposed between the insulation layers 10,10, the thermal conductivity as a whole can be enhanced as compared to a single layer of the insulation layer 10. The insulation properties of the gap layer 2,6 is satisfactorily retained due to the insulation properties of the insulation layer 10.

Whereas the insulation layer 10 is preferably composed of an insulation film having a high thermal conductivity such as of AlN as described above, it can also be composed of $Al_2O_3$, $SiO_2$ or other material conventionally used as gap layers. $Al_2O_3$ and $SiO_2$ have extremely high insulation properties in spite of their low thermal conductivity.

When the insulation layer 10 is, however, composed of $Al_2O_3$, $SiO_2$ or other conventional material, its thickness should preferably be minimized. When the insulation layer 10 composed of $Al_2O_3$ or $SiO_2$ is thick, heat does not pass the insulation layer 10 due to its low thermal conductivity and hence the element temperature of the magnetoresistive element layer 16 elevates in the same manner as conventional equivalents. Incidentally, the insulation properties of the insulation film 10 composed of $Al_2O_3$ or $SiO_2$ can be retained even when the thickness of the film 10 is thin.

When the insulation layer 10 is composed of an insulation film having a high thermal conductivity such as AlN, it is also preferable that the film thickness of insulation film 10 is minimized within the range retaining satisfactory insulation properties. A thin insulation film 10 enables heat generated from the magnetoresistive element layer 16 to transmit more efficiently to the shield layer 1 or 7.

In the present invention, when the gap layer 2,6 has a multilayer structure illustrated in FIG. 5, a layer facing the magnetoresistive element layer 16 should be formed of the insulation layer 10. To be more specific, when the lower gap layer 2 is composed of the multilayer structure as shown in FIG. 5, a top layer of the lower gap layer 2 is formed of an insulation layer 10, and when the upper gap layer 6 is composed of the multilayer structure, a bottom layer of the upper gap layer 6 is composed of an insulation layer 10.

This is because if a layer of the gap layer 2,6 in contact with the magnetoresistive element layer 16 is composed of a non-magnetic metal layer 11, a sensing current to flow through the magnetoresistive element layer 16 also flows towards a non-magnetic metal layer 11.

When the upper gap layer 16 has the multilayer structure shown in FIG. 5, a non-magnetic metal layer 11 should be inhibited to be formed around the connection 9 illustrated in FIG. 3.

As described above, a sensing current flows from the main electrode layer 8 through the connection 9 to the electrode layer 5. When a non-magnetic metal layer 11 is formed adjacent to or in contact with the connection 9, the current also flows into the non-magnetic metal layer 11 through the connection 9.

Figure 6:
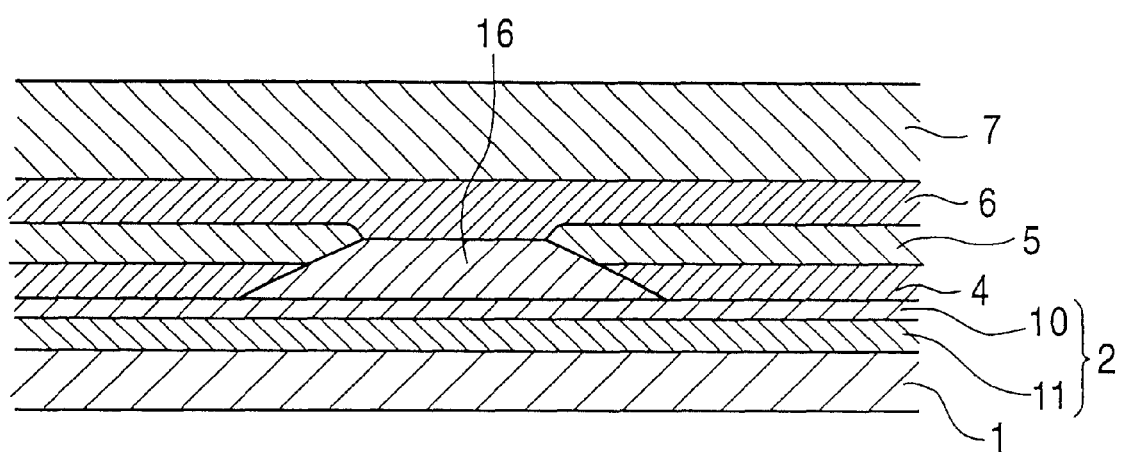
FIG. 6 is an enlarged sectional view of a thin film magnetic head illustrating a fourth embodiment of the invention.

FIG. 6 is a sectional view illustrating a thin film magnetic head when the lower gap layer 2 has a simplest multilayer structure as shown in FIG. 5, i.e., a two-layer structure.

As illustrated in FIG. 6, an upper layer of the lower gap layer 2 facing the magnetoresistive element layer 16 is composed of an insulation layer 10, and a lower layer of the lower gap layer 2 facing the lower shield layer 1 is composed of a non-magnet metal layer 11.

According to the present invention, the upper gap layer 6 can have a two-layer structure similar to the lower gap layer 2, and in such a case, a lower layer of the upper gap layer 6 facing the magnetoresistive element layer 16 is formed of an insulation layer 10, and its upper layer facing the upper shield layer 7 is formed of a non-magnetic metal layer 11.

When the upper gap layer 6 has a two-layer structure, a non-magnetic metal layer 11 should be prevented from forming around the connection 9 shown in FIG. 3. This is because if the non-magnetic metal layer 11 is formed in contact with the connection 9, a current from the main electrode layer 8 also flows into the non-magnetic metal layer 11.

The upper gap layer 6 illustrated in FIG. 6 is composed of a single layer, and this upper gap layer 6 is preferably formed of an insulation film having a high thermal conductivity such as of AlN or SiC as mentioned above.

Whereas the insulation layer 10 constituting the lower gap layer 2 is preferably composed of an insulation film of, for example, AlN or SiC having a high thermal conductivity as described above, it can also be composed of a film of $Al_2O_3$ or $SiO_2$ having a low thermal conductivity. In such a case, the thickness of the insulation layer 10 should advantageously be minimized.

The non-magnetic metal layer 11 is preferably formed of one or more members selected from Cu, Ag, Au, Ti and Cr.

According to this embodiment, as the lower gap layer 2 has a two-layer structure being simplest among the multilayer structures as shown in FIG. 5, the lower gap layer 2 having a multilayer structure (two-layer structure) can be obtained by a least number of manufacturing steps with ease.

In addition, since the lower gap layer 2 comprises the non-magnetic metal layer 11 having a high thermal conductivity, heat generated from the magnetoresistive element layer 16 can efficiently be transmitted to the lower shield layer 1 as compared to the upper gap layer 6 formed of a single layer.

As described above, in the present invention, at lease one of the lower gap layer 2 and the upper gap layer 6 (hereinafter briefly referred to as the gap layer 2,6) is improved in its material or structure so as to enhance its thermal conductivity.

As practical examples of the material of the gap layer 2,6 in this embodiment, there may be mentioned insulation films each composed of one or more members selected from the group consisting of AlN, SiC, diamond-like carbon (DLC), BN, MgO, SiAlON, AlON, $Si_3N_4$, SICO, SiN, SION and SICON. These insulation films have a higher thermal conductivity than films of $Al_2O_3$ or $SiO_2$ conventionally used as gap layers.

In addition, to further enhance the thermal conductivity, the crystallinity of the insulation film is improved or the insulation film is incorporated with non-magnetic metal grains.

In particular, it is advantageous in the embodiment to use AlN having a satisfactory crystallinity and a high thermal conductivity as the gap layer 2,6.

In such a case, a crystal face of a crystalline phase is preferably oriented in the direction perpendicular to the film plane. More concretely, it is preferable that either a (002) plane or a (220) plane of the crystalline phase is oriented in the direction perpendicular to a plane of the film, or that the (002) plane of the crystalline phase is preferred-oriented in the direction perpendicular to the film plane so that the peak intensity ratio of the (002) plane relative to the (220) plane measured by X-ray diffractometry is more than 0 and equal to or less than 3.5, or equal to or more than 9.7.

The orientation as mentioned above can further enhance the thermal conductivity of the AlN film.

According to the embodiment of the invention, it is advantageous to improve alkaline resistance of the AlN film by separating a light element such as B or C in crystal grain boundary phase of the AlN film. In addition, it is advantageous to form a protective layer composed of an insulation material having a high alkaline resistance onto the AlN film.

Further, an anchor layer composed of an insulation material is preferably formed under the AlN film to prevent the AlN film from peeling. The anchor layer should, however, be an amorphous phase.

Next, according to the invention, the gap layer 2,6 has a multilayer structure or two-layer structure composed of an insulation layer and a non-magnetic metal layer, whereas such a gap layer 2,6 is conventionally composed of a single layer. The aforementioned multilayer structure can further improve the thermal conductivity of the gap layer 2,6.

The gap layer 2,6 improved in material or structure as above has excellent insulation properties and a high thermal conductivity. Accordingly, even when a current density is increased for providing a higher recording density, heat generated from the magnetoresistive element layer 16 is efficiently transmitted through the gap layer 2,6 to the shield layer 1 or 7 so as to prevent the temperature of element of the magnetoresistive element layer 16 from elevating and to obtain a satisfactory regeneration sensitivity.

The present invention will now be described in more detail with reference to the following examples.

EXAMPLES

A thin film magnetic head as shown in FIG. 1 having lower and upper gap layers 2 and 6 composed of AlN was prepared as an inventive example; and that composed of $Al_2O_3$ was prepared as a comparative example. The relationship between a sensing current and an elevation rate of temperature of the magnetoresistive element layer 16 in both thin film magnetic heads was examined. The results are set forth in FIG. 11. The thin film magnetic heads of the inventive example and comparative example were prepared so as to have the same direct current resistance (DCR) of element.

Figure 11:
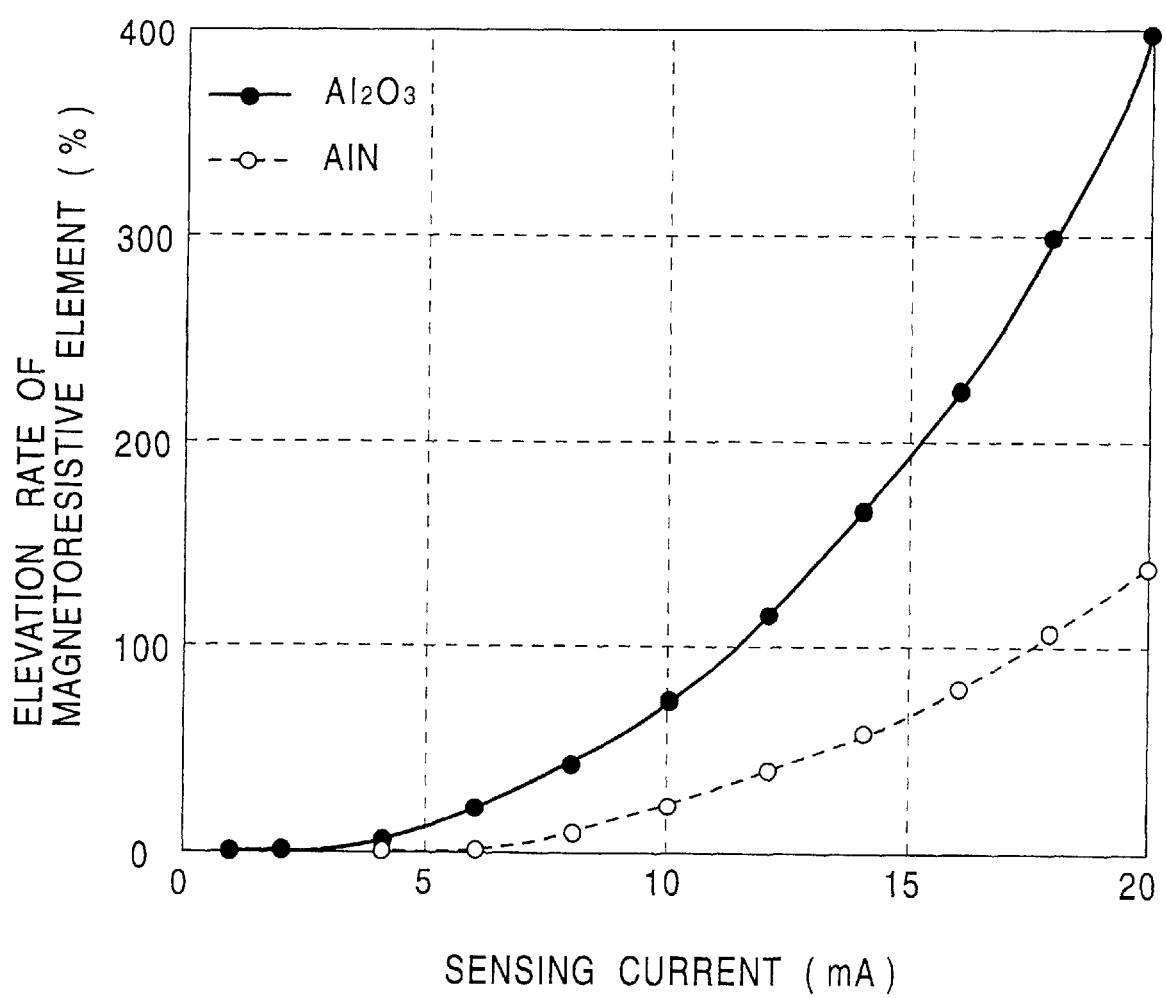
FIG. 11 is a graph showing the relationship between a sensing current and an elevation rate of the temperature of a magnetoresistive element layer in a gap layer composed of AlN and in a gap layer composed of $Al_2O_3$.

As apparent from FIG. 11, it was found that the elevation rate of the element temperature of the magnetoresistive element layer 16 increases with an increasing sensing current regardless of whether the gap layer 2,6 is composed of $Al_2O_3$ or AlN, and that when the gap layer 2,6 is composed of AlN, the temperature elevation rate can be suppressed as compared to the gap layer 2,6 composed of $Al_2O_3$.

This is because AlN has a higher thermal conductivity than $Al_2O_3$, and hence the gap layer 2,6 composed of AlN enables heat generated from the magnetoresistive element layer 16 to escape more efficiently to the shield layer 1 or 7 so as to prevent the temperature of the magnetoresistive element layer 16 from elevating when compared to the gap layer 2,6 composed of $Al_2O_3$.

Next, orientation of a (002) plane of an AlN film was investigated and the relationship between the orientation of the (002) plane and elevation rate of the element temperature was examined.

Figure 12:
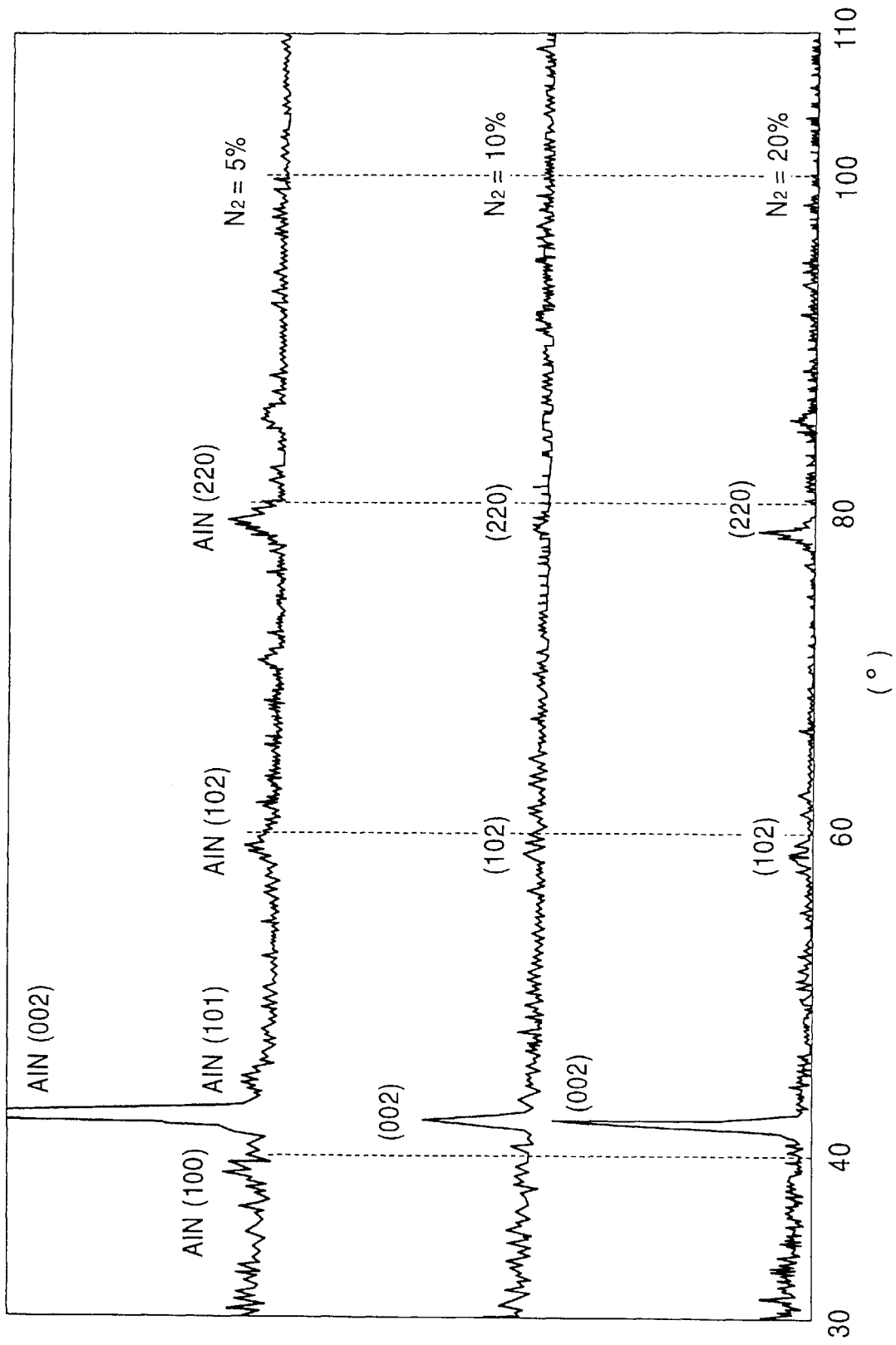
FIG. 12 is an X-ray diffractometry image of an AlN film obtained by sputtering at an $N_2$ flow ratio of 5%, 10% or 20%.

FIG. 12 is an X-ray diffractometry image of an AlN film obtained by film-formation using an AlN target at an $N_2$ flow ratio of 5%, 10% or 20%.

As shown in FIG. 12, the peak of the (002) plane is greatest in each of the AlN films obtained at an $N_2$ flow ratio of 5%, 10% or 20%.

The intensity ratio of a diffraction line from the (002) plane relative to a diffraction line from the (220) plane at each $N_2$ flow ratio in the X-ray diffractometry was then determined. As a result, the peak intensity ratios of the (002) plane relative to the (220) plane at $N_2$ flow ratios of 5%, 10% and 20% were 7.0, 10.7 and 4.3, respectively.

Next, the elevation rates of the element temperatures of the magnetoresistive element layers 16 were determined, which element layers were each obtained by using, as the gap layer 2,6 shown in FIG. 1, AlN films formed at an $N_2$ flow ratio of 5%, 10% or 20% respectively.

Figure 13:
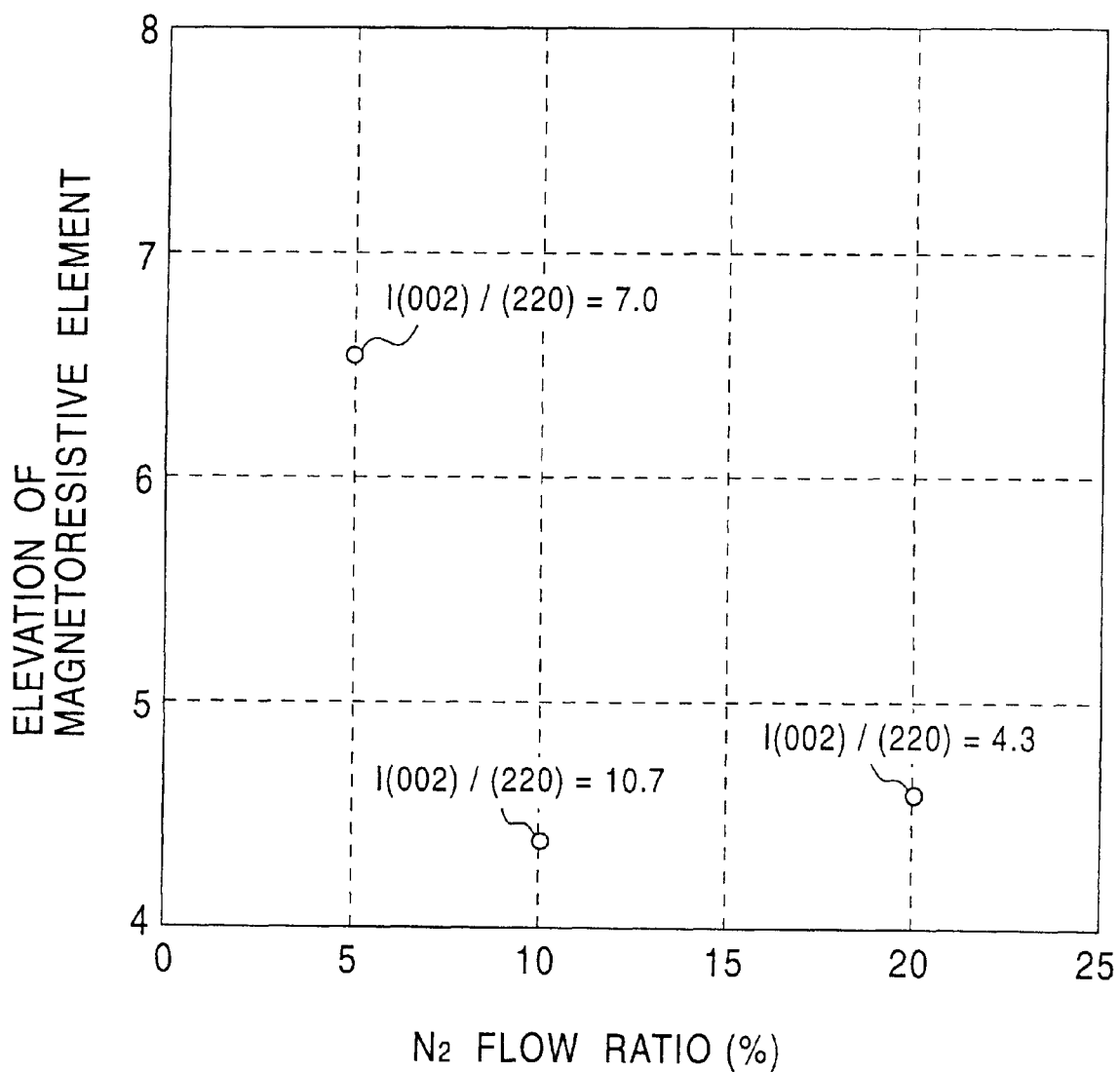
FIG. 13 is a graph illustrating the relationship between the $N_2$ flow ratio in sputtering and elevation of temperature of the element in a gap layer composed of AlN.

The elevation rate of the element temperature was defined as a ratio of the temperature of the element at a sensing current (Is) of 20 mA relative to the temperature of the element at a sensing current (Is) of 1 mA. The test results are shown in FIG. 13. Incidentally, the thin film magnetic heads were formed to have the same direct current resistance (DCR) with each other.

As is apparent from FIG. 13, the elevation rate of the element temperature was least at an $N_2$ flow ratio of 10%, i.e., at a peak intensity ratio of the (002) plane relative to the (220) plane of 10.7; less at an $N_2$ flow ratio of 20%, i.e., at a peak intensity ratio of the (002) plane relative to the (220) plane of 4.3; and largest at an $N_2$ flow ratio of 5%, i.e., at a peak intensity ratio of the (002) plane relative to the (220) plane of 7.0.

It was found from these test results that a larger peak intensity ratio of the (002) plane relative to the (220) plane does not always decrease the elevation rate of the element temperature.

As is shown in FIG. 13, the elevation rate of the element temperature with the peak intensity ratio of the (002) plane relative to the (220) plane of 7.0 was higher than that with peak intensity ratio of the (002) plane relative to the (220) plane of 4.3.

Accordingly, it is supposed that the peak intensity ratio of the (002) plane relative to the (220) plane has an optimum range for decreasing the elevation rate of the element temperature.

Figure 14:
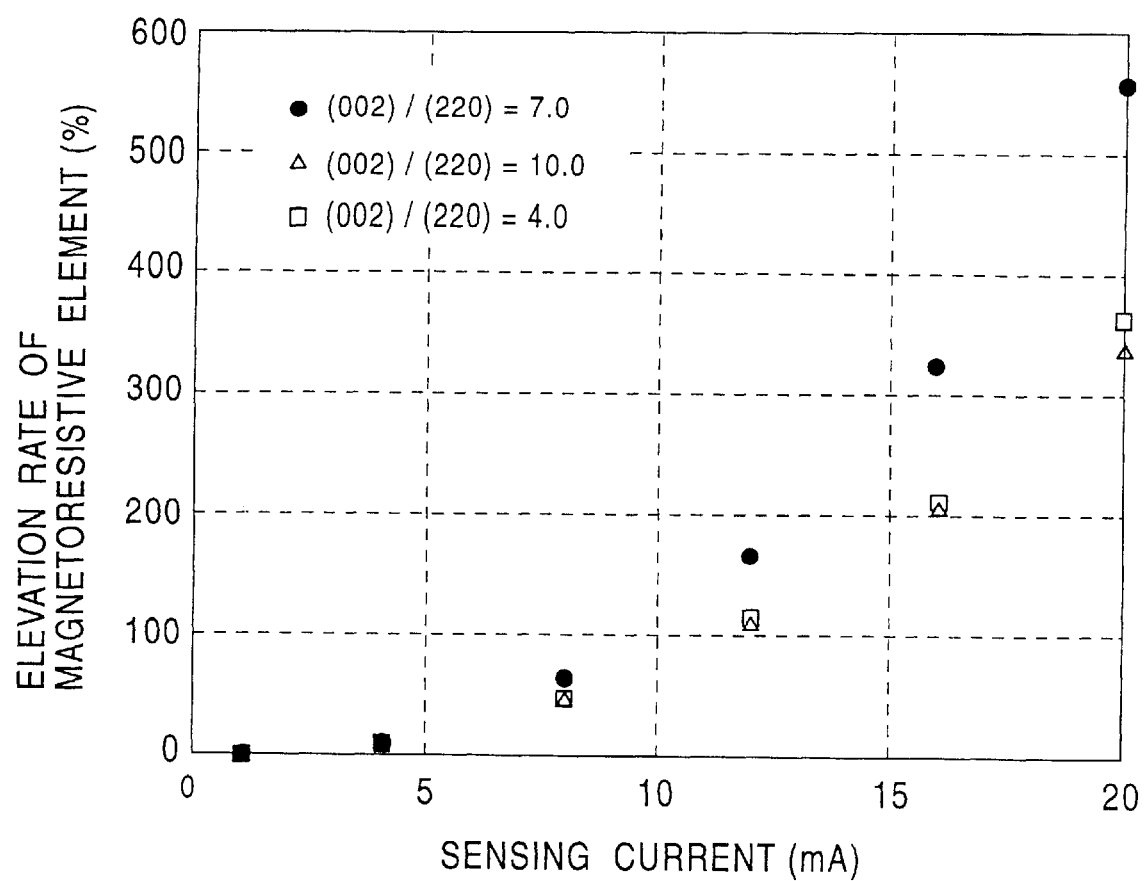
FIG. 14 is a graph showing the relationship between a sensing current and an elevation rate of the temperature of the element when the peak intensity ratio of a (002) plane relative to a (220) plane of an AlN film as the gap layer is 4.0, 7.0 or 10.0.

FIG. 14 is a graph showing the relationship between the sensing current and elevation rate of the temperature of the element at a peak intensity ratio of the (002) plane relative to the (220) plane of 7.0, 10.0 or 4.0.

As is apparent from FIG. 14, when the sensing current was increased, the elevation rate of the element part temperature was largest at a peak intensity ratio of the (002) plane relative to the (220) plane of 7.0, and smallest at 10.0.

Next, the curve of the elevation rate was interpreted as a quadric ($Y=aX^2+b$; a and b are constants), and constant "a" was determined at each peak intensity ratio.

In the test, the relationship between the sensing current and the elevation rate of the element temperature at a peak intensity ratio of the (002) plane relative to the (220) plane of 2.0, 3.0, 6.0, 8.0, 12.0 or 13.0 was also determined, and constant "a" at each peak intensity ratio was calculated. The test results are set forth in FIG. 15.

Figure 15:
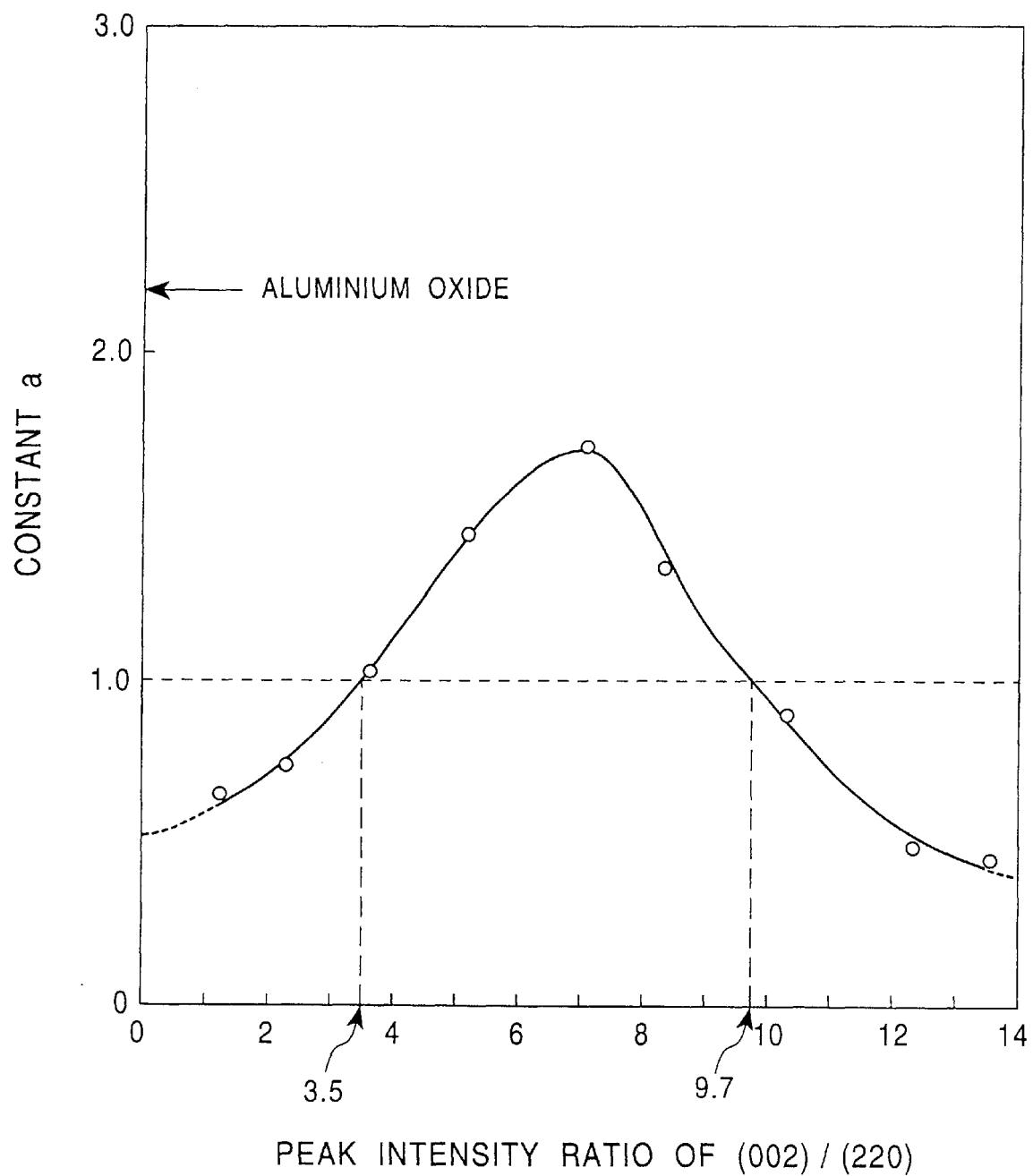
FIG. 15 is a graph illustrating the relationship between the peak intensity ratio of a (002) plane relative to a (220) plane and a constant "a" when the curve at each of the intensity ratios shown in FIG. 14 is defined as a quadric, $Y=aX^2+b$.
Figure 16:
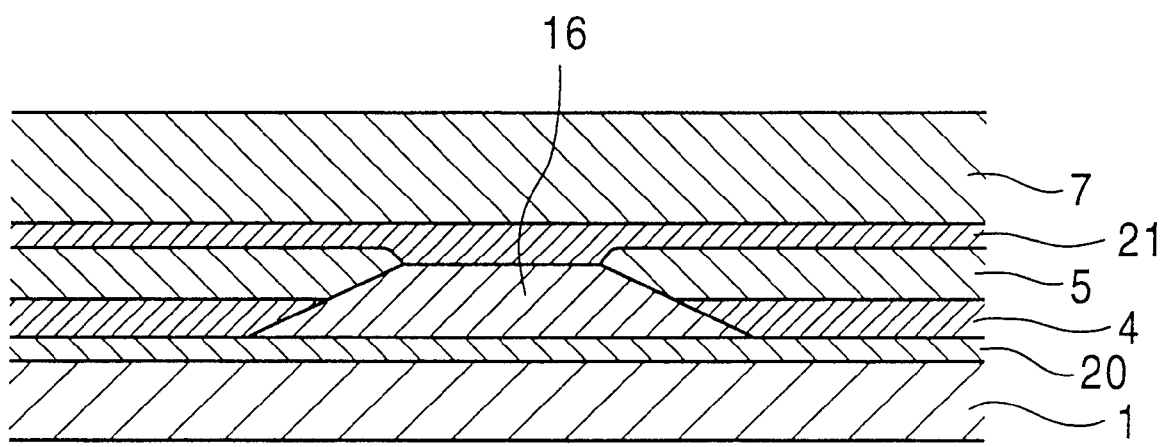
FIG. 16 is an enlarged sectional view of a thin film magnetic head having a conventional structure.

As is seen from FIG. 15, the constant "a" increased to a peak at a peak intensity ratio of the (002) plane relative to the (220) plane of about 7.0, and fell at a peak intensity ratio of the (002) plane relative to the (220) plane higher than about 7.0.

Since the lower the constant "a" is, the lower is the elevation rate of the element part temperature relative to the sensing current, the preferred range was defined as of the constant "a" being equal to or less than 1.0. The range of peak intensity ratio of the (002) plane relative to the (220) plane giving the constant "a" of equal to or less than 1.0 was determined from FIG. 15.

As is indicated in FIG. 15, the constant "a" can be equal to or less than 1.0 when the peak intensity ratio is equal to or less than 3.5, or equal to or more than 9.7.

In addition, when the peak intensity ratio of the (002) plane relative to the (220) plane approximates to 0, the thermal conductivity of the AlN film seems to be enhanced.

When the peak intensity ratio of the (002) plane relative to the (220) plane is below 1.0 and approximates zero, the (220) plane is preferred-oriented in the direction perpendicular to the film plane.

In other words, to enhance the thermal conductivity of an AlN film, a crystal face of the crystalline phase of AlN film has only to be preferred-oriented in the direction perpendicular to the film plane, and, for example, the peak intensity ratio of the (002) plane relative to the (220) plane is preferably more than 0 and equal to or less than 3.5, or equal to or more than 9.7, as illustrated in FIG. 15.

The peak intensity ratio of the (002) plane relative to the (220) plane of 0 is also desirable. To be more specific, it is advantageous that either the (220) plane or the (002) plane of the crystalline phase is oriented in the direction perpendicular to the plane of the film.

As described in detail above, the present invention where the lower gap layer and/or upper gap layer is formed of AlN, SiC or the like having a higher thermal conductivity than that of a conventional gap layer formed of, for example, $Al_2O_3$, enables heat generated from a magnetoresistive element layer to be transmitted efficiently to a shield layer.

The thermal conductivity can further be enhanced by increasing crystallinity of AlN, SiC or the like or by incorporating non-magnetic metal grains into the film.

According to the invention, AlN can particularly advantageously be employed as a gap layer, and in such a case, it is more advantageous to preferred-orient a (002) plane of the AlN film in a direction perpendicular to a plane of the film for further improving its thermal conductivity.

To be more specific, the peak intensity ratio of the (002) plane relative to the (220) plane should preferably be equal to or less than 3.5, or equal to or more than 9.7.

When AlN is employed as a gap layer according to the present invention, a light element such as B or C should advantageously be separated in its crystal grain boundary phase for improving the corrosion resistance of the AlN film against an alkaline aqueous solution.

In addition, an adhesion layer constituted of an insulation material such as $Al_2O_3$ and being amorphous is preferably formed under the AlN film for preventing the AlN film from peeling.

According to another aspect of the present invention where the gap layer has a multilayer structure or two-layer structure composed of an insulation layer and a non-magnetic metal layer having a higher thermal conductivity than the insulation layer, the thermal conductivity of the gap layer can further be enhanced as compared to a gap layer composed of a single-layer structure.

As described above, the present invention can enhance the thermal conductivity of the gap layer by improving material or structure of the gap layer. Accordingly, even when a current density is increased in order to increase a recording density, heat generated from a magnetoresistive element layer is efficiently transmitted to a shield layer so as to prevent the temperature of element of the magnetoresistive element layer from elevating and thereby to enhance its regeneration sensitivity.

Other embodiments and variations will be obvious to those skilled in this art, this invention is not to be limited except as set forth in the following claims.

What is claimed is:

1. A thin film magnetic head comprising a magnetoresistive element layer formed on a lower shield layer with the interposition of a lower gap layer, an electrode layer for imparting a sensing current to said magnetoresistive element layer, and an upper shield layer formed on the eletrode layer with the interposition of an upper gap layer, at least one of said lower gap layer and said upper gap layer having an insulating film primarily composed of one or more members selected from the group consisting of AlN, SiC, BN, MgO, SiAlON, AlON, $Si_3N_4$, SiCO, SiN, SiON and SiCON, wherein said insulating film has a structure comprising crystalline phases and a crystal grain boundary phase between the crystalline phases, and the crystal grain boundary phase is an amorphous phase containing at least one element selected from the group consisting of B, C, O and Si.

2. The thin film magnetic head as claimed in claim 1, wherein said insulating film is primarily composed of AlN, and has a structure comprising crystalline phases and a crystal grain boundary phase between the crystalline phases, and the crystal grain boundary phase is an amorphous phase containing at least one element selected from the group consisting of B, C, O and SI.

3. The thin film magnetic head as claimed in claim 2, wherein a crystal plane of the crystalline phase is preferentially oriented in a direction perpendicular to a plane of the film.

4. The thin film magnetic head as claimed in claim 3, wherein a (002) plane of the crystalline phase is oriented in a direction perpendicular to a plane of the film.

5. The thin film magnetic head as claimed in claim 3, wherein a (220) plane of the crystalline phase is oriented in a direction perpendicular to a plane of the film.

6. The thin film magnetic head as claimed in claim 3, wherein a (002) plane of the crystalline phase is preferentially oriented in a direction perpendicular to a plane of the film.

7. The thin film magnetic head as claimed in claim 3, wherein a (220) plane of the crystalline phase is preferentially oriented in a direction perpendicular to a plane of the film.

8. The thin film magnetic head as claimed in claim 3, wherein a ratio of the peak intensity of a (002) plane to the peak intensity of a (220) plane measured by X-ray diffractometry is in a range of more than 0 to 3.5 or in a range of 9.7 or more.

9. The thin film magnetic head as claimed in claim 3, wherein a ratio of the peak intensity of a (002) plane to the peak intensity of a (220) plane measured by X-ray diffractometry is in a range of more than 0 to less than 1.0.

10. The thin film magnetic head as claimed in claim 2, wherein the crystalline phase of said insulating film comprises a columnar crystal.

11. The thin film magnetic head as claimed in claim 10, wherein a crystal plane of the crystalline phase of said insulating film is preferentially oriented in a direction perpendicular to a plane of the film.

12. The thin film magnetic head as claimed in claim 11, wherein a (002) plane of the crystalline phase is oriented in a direction perpendicular to a plane of the film.

13. The thin film magnetic head as claimed in claim 11, wherein a (220) plane of the crystalline phase is oriented in a direction perpendicular to a plane of the film.

14. The thin film magnetic head as claimed in claim 11, wherein a (002) plane of the crystalline phase is preferentially oriented in a direction perpendicular to a plane of the film.

15. The thin film magnetic head as claimed in claim 11, wherein a (220) plane of the crystalline phase is preferentially oriented in a direction perpendicular to a plane of the film.

16. The thin film magnetic head as claimed in claim 11, wherein a ratio of the peak intensity of a (002) plane to the peak intensity of a (220) plane measured by X-ray diffractometry is in a range of more than 0 to 3.5 or in a range of 9.7 or more.

17. The thin film magnetic head as claimed in claim 11, wherein a ratio of the peak intensity of a (002) plane to the peak intensity of a (220) plane measured by X-ray diffractometry is in a range of more than 0 to less than 1.0.

18. The thin film magnetic head as claimed in claim 1, wherein said insulating film further comprises non-magnetic metal grains.

19. The thin film magnetic head as claimed in claim 18, wherein said non-magnetic metal grains comprise at least one element selected from the group consisting of Cu, Ag, Au, Ti and Cr.

20. A thin film magnetic head comprising a magnetoresistive element layer formed on a lower shield layer with the interposition of a lower gap layer, an electrode layer for imparting a sensing current to said magnetoresistive element layer, and an upper shield layer formed on the eletrode layer with the interposition of an upper gap layer, at least one of said lower gap layer and said upper gap layer having an insulating film primarily composed of one or more members selected from the group consisting of AlN, SiC, BN, MgO, SiAlON, AlON, $Si_3N_4$, SiCO, SiN, SiON and SiCON, wherein said insulating film further comprises non-magnetic metal grains.

21. The thin film magnetic head as claimed in claim 20, wherein said non-magnetic metal grains comprise at least one element selected from the group consisting of Cu, Ag, Au, Ti and Cr.

22. A thin film magnetic head comprising a magnetoresistive element layer formed on a lower shield layer with the interposition of a lower gap layer, an electrode layer for imparting a sensing current to said magnetoresistive element layer, and an upper shield layer formed on the eletrode layer with the interposition of an upper gap layer, at least one of said lower gap layer and said upper gap layer having an insulating film primarily composed of AlN, wherein said insulating film comprises a crystalline phase, and a crystal plane of the crystalline phase is preferentially oriented in a direction perpendicular to a plane of the film.

23. The thin film magnetic head as claimed in claim 22, wherein a (002) plane of the crystalline phase is oriented in a direction perpendicular to a plane of the film.

24. The thin film magnetic head as claimed in claim 22, wherein a (220) plane of the crystalline phase is oriented in a direction perpendicular to a plane of the film.

25. The thin film magnetic head as claimed in claim 22, wherein a (002) plane of the crystalline phase is preferentially oriented in a direction perpendicular to a plane of the film.

26. The thin film magnetic head as claimed in claim 22, wherein the peak intensity ratio of a (002) plane relative to a (220) plane of the crystalline phase measured by X-ray diffractometry is in a range of more than 0 to 3.5 or in a range of 9.7 or more.

27. The thin film magnetic head as claimed in claim 22, wherein a (220) plane of the crystalline phase is preferentially oriented in a direction perpendicular to a plane of the film.

28. The thin film magnetic head as claimed in claim 22, wherein a ratio of the peak intensity of a (002) plane to the peak intensity of a (220) plane measured by X-ray diffractometry is in a range of more than 0 to less than 1.0.

29. The thin film magnetic head as claimed in claim 22, wherein the crystalline phase of said insulating film comprises a columnar crystal.

30. The thin film magnetic head as claimed in claim 29, wherein a (002) plane of the crystalline phase of said insulating film is preferentially oriented in a direction perpendicular to a plane of the film.

31. The thin film magnetic head as claimed in claim 29, wherein a (220) plane of the crystalline phase is oriented in a direction perpendicular to a plane of the film.

32. The thin film magnetic head as claimed in claim 29, wherein a (002) plane of the crystalline phase is preferentially oriented in a direction perpendicular to a plane of the film.

33. The thin film magnetic head as claimed in claim 30, wherein a (220) plane of the crystalline phase is preferentially oriented in a direction perpendicular to a plane of the film.

34. The thin film magnetic head as claimed in claim 30, wherein a ratio of the peak intensity of a (002) plane to the peak intensity of a (220) plane measured by X-ray diffractometry is in a range of more than 0 to 3.5 or in a range of 9.7 or more.

35. The thin film magnetic head as claimed in claim 30, wherein a ratio of the peak intensity of a (002) plane to the peak intensity of a (220) plane measured by X-ray diffractometry is in a range of more than 0 to less than 1.0.

36. The thin film magnetic head as claimed in claim 22, wherein said insulating film has a structure comprising crystalline phases and a crystal grain boundary phase between the crystalline phases, and the crystal grain boundary phase is an amorphous phase containing at least one element selected from the group consisting of B, C, O and SI.

* * * * *